United States Patent Office 3,836,535
Patented Sept. 17, 1974

3,836,535
N-METHYL-N'-(2-AMINO ETHYL SULFONYL)-PIPERAZINE
Shun-Ichi Naito, 35 Murasakino Kamitoridacho, Kita-ku, Kyoto, Japan
No Drawing. Original application July 19, 1971, Ser. No. 164,007, now Patent No. 3,743,647, dated July 3, 1973. Divided and this application Dec. 1, 1972, Ser. No. 311,252
Claims priority, application Japan, Aug. 27, 1970, 45/75,350, 45/75,351, 45/75,352; Dec. 18, 1970, 45/114,446, 45/114,447
Int. Cl. C07d 51/72
U.S. Cl. 260—268 S     2 Claims

ABSTRACT OF THE DISCLOSURE

Aminoethanesulfonyl derivatives having a general formula R—$SO_2CH_2CH_2Y$ where R is selected from a group consisting of thiazolyl-2-amino, 1-pyrrolyl, 4-methylpiperazyl, and 1-indolyl and Y is $NH_2$ or, when R is thiazolyl-2-amino, said Y may be nicotinoylamino as well as manufacture methods thereof were disclosed.

---

This is a division of application Ser. No. 164,007 filed July 19, 1971, now Pat. No. 3,743,647 issued July 3, 1973.

The present invention relates to aminoethanesulfonyl derivatives of the general formula

R—$SO_2CH_2CH_2Y$ in which R is selected from a group consisting of

 (thiazolyl-2-amino),

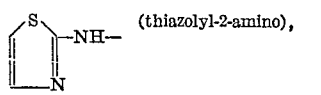 (1-pyrrolyl),

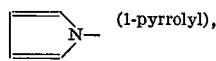 (4-methylpiperazyl), and

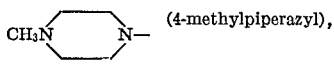 (1-indolyl)

and Y is $NH_2$. In case R is thiazolyl-2-amino, the Y may also be nicotinoylamino. This invention also relates to manufacturing methods for these aminoethanesulfonyl derivatives.

All of these aminoethanesulfonyl derivatives are novel compounds having never been disclosed in any literature including patent specification. They are useful as medicines, such as analgesics, with little side effects. These compounds are characterized by containing taurine which is one of amino acids and has surface activity as well as analgesic action and, when they are given to human beings, their effects are not lowered even when subjected to a detoxication reaction in vivo such as an acetylation. Furthermore, some of these compounds are also useful as anti-histaminic, hypochloesterolemic and anti-inflammatory drugs.

Although the compounds of this invention have considerable water solubility, they are resistant to moisture to such an extent that, even when they are allowed to stand in an open container placed in a room for one year, more than 90% of the content remains unchanged in most cases indicating little absorption of moisture. In addition, the aqueous solution thereof is also stable. Thus, for example, when a 5% aqueous solution of them is allowed to stand at room temperature for one year, more than 90–95% thereof remains unchanged. This is practically advantageous, particularly in view of use of the compounds in injection.

Compounds of this invention can be manufactured by various routes which will be explained in detail.

Thus, for example, compounds where Y is nicotinoylamino group can be manufactured by nicotinoylation of the corresponding amino compounds or by nicotinoylamination of the corresponding halides. The latter method (nicotinoylamination of halides) will be disclosed later in an item of amination reaction.

The former method, i.e. nicotinoylation of aminoethanesulfonylaminothiazole (I), may be represented as:

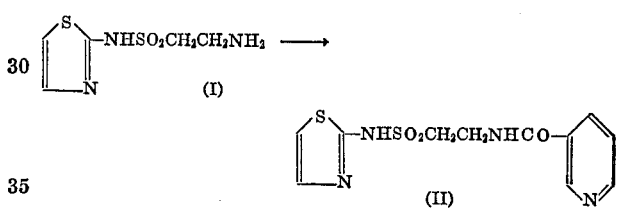

In order to carry out the present nicotinoylation, any of known method for nicotinoylation may be employed. It is preferred to effect the nicotinolylation by use of acids bearing a nicotinoyl group or the functional derivatives thereof such as acid anhydrides, acid esters, acid halides or the mixtures thereof. These acids and their functional derivatives may also be employed in the form of their salts. The reaction may be carried out at either normal temperature or with heating and under normal pressures or pressures above normal, depending upon the kinds, quantities or the like of the reactants used. Furthermore the starting material (I) of the present reaction may be employed in its salt form.

The present method will be further explained in detail with particular reference to the following examples, but it will be understood that these examples be preferred embodiments of the present method used only to illustrate but not limit the invention.

EXAMPLE 1

Into 0.1 mole of the starting material or its hydrochloride is added from 100 to 200 ml. of anhydrous pyridine with subsequent addition of nicotinic acid chloride hydrochloride (0.1 mole). After heating the mixture for an hour, or, alternatively, standing the same whole day at a room temperature, the mixture is heated for an additional one hour. The pyridine is distilled off under reduced pressure from the reaction mixture, the residue recrystallized several times from either methanol or from ethanol to obtain the desired product (II) as its hydrochloride having a melting point of 289° C. (Colorless needles). Into said residue from which the pyridine has been distilled off is added water and the mixture is made alkaline (pH about 9) by use of aqueous ammonia (of about 28%). The resulting mixture is evaporated under reduced pressure to dryness and the residue recrystallized several times from water to obtain the desired product (II) as colorless needles having a melting point of 228° C. The yields of the desired product and its hydrochloride are almost identical and within the range of from about 70 to 75% of the theory.

Element Analysis

Desired product (II).—Calculated for $C_{11}H_{12}N_4O_3S_2$: C, 42.31; H, 3.85; N, 17.95. Found: C, 42.37; H, 3.90; N, 18.03.

The hydrochloride of the desired product (II).— Calculated for $C_{11}H_{14}N_4O_3S_2Cl_2$: C, 34.29; H, 3.64; N, 14.55. Found: C, 34.40; H, 3.51; N, 14.58.

Employment of nicotinic acid chloride in place of the nicotinic acid chloride hydrochloride did not cause any change in yields. Furthermore, it has been ascertained that the condensation reaction between the starting material (II) or the salt thereof, and nicotinic acid chloride can proceed also in water or various organic solvents, as well as in pyridine and that it also proceeds advantageously when a small quantity of pyridine or alkali is added into the water or various organic solvents.

For example, 0.1 mole of the starting material (I) or its hydrochloride is charged with 500 ml. of ethyl acetate, into which mixture 0.1 mole of nicotinic acid chloride hydrochloride is added followed by heating under reflux in water bath for 3 hours. After distilling off the ethyl acetate from the reaction mixture remains yellowish solids, which are then recrystallized from ethanol or methanol to obtain the hydrochloride of the desired product (II). Alternatively, said residual solids are dissolved in a small amount of water, which solution is made alkaline by use of ammonia (pH about 9) and distilled under reduced pressure to remove the water. The residue is recrystallized from water to obtain the desired product (II) in its pure form. In this case, the yield was little different from that obtained in the case of employment of pyridine as solvent.

In addition, in the following examples 2 and 3 are shown the embodiments of the invention wherein nicotinic acid anhydride and nicotinic acid are employed in place of nicotinic acid chloride(hydrochloride) used in Example 1.

EXAMPLE 2

Into a 100 ml. three-necked flask are placed 0.1 mole of the starting material (I), 0.1 mole of nicotinic acid anhydride and 100 ml. of anhydrous pyridine followed by heating the mixture on boiling water bath with agitation for 7 hours. The pyridine is distilled off under reduced pressure and to the residue is added strong aqueous ammonia (of about 28%) to make it alkaline, whereupon yellowish-white substance precipitates. The mixture is, as such, subjected to distillation under reduced pressure to remove the water, the residue recrystallized several times from water to obtain the desired product (II) in its pure form. The crystals, when subjected to mixed examination using the corresponding standard, show no lowering in their melting point. The yield is about 70%.

EXAMPLE 3

Into a three-necked flask with a water-separating tube attached thereto are charged 0.1 mole of the starting materials (I), 0.1 mole of nicotinic acid and 400 ml. of p-cymene followed by heating with stirring at a temperature of from 180 to 190° C. for about 6 hours. The water formed is azeotropically distilled off. After cooling, the p-cymene is distilled off under reduced pressure, the residue being made alkaline (pH about 9) by use of strong aqueous ammonia followed by distilling off the water under reduced pressure. The residue is recrystallized several times from water to obtain the pure desired product (II). The product, when subjected to mixed examination using the corresponding standard material, show no lowering in its melting point. The yield is about 65%.

Referring now by way of precaution, the method according to the present invention can also be effected by proceeding the reaction in the presence of catalyst. Nicotinoylaminoethane-sulfonylaminothiazol (II) contains, in its structure, a pyridine ring of nicotinic acid and, since the nitrogen atom in said ring is basic, it may be, of course, optionally reacted with any organic or inorganic acid to form the corresponding acid addition salt. Subsequently, in order to purify the end product, there may be employed, as well as the hydrochloride, any organic salts as for example, its fumarate, flavianate or tartarate. For example, the end product (II) may be readily purified by forming its hydrochloride by either adding thereto concentrated hydrochloric acid followed by evaporation under reduced pressure to dryness or introducing gaseous HCl into a solution of the desired product (II) in methanol or ethanol, with subsequent recrystallization of the hydrochloride from methanol or ethanol.

The above disclosure is an explanation in detail of a method to manufacture nicotinoylamino compounds by nicotinoylation of the corresponding amino compounds.

Compounds of the present invention in which Y is an amino radical can be manufactured by the following two methods:

(1) Amination of the corresponding halides
(2) Deacylation of the corresponding acylamino (or acylimino) compounds The amination according to (1) will be explained at first together with a nicotinoylamination of the corresponding halides for the sake of convenience.

Said amination method can be accomplished by the reaction of the halide of the formula $$R—SO_2CH_2CH_2Z \qquad (III)$$

(where R is as defined already; Z is halogen) with ammonia or nicotinic acid amide.

The halogen designated by Z in the above-described formula is preferably chlorine, bromine or iodine, of which chlorine is particularly preferred.

The ammonia or nicotinic acid amide to be reacted may be used as such or after dissolving or suspending in water and/or organic solvent, and its salts with acids may also be employed, if desired. The reaction in accordance with the present invention may proceed under normal pressure, although it is preferred to carry out the reaction under pressure above normal, in which case it is more preferred to effect the reaction in the presence of catalyst as for example, NaI, $Cu_2Cl_2$, $NH_4I$ or the like compound.

The halides to be employed as the starting materials according to the present invention are also novel compounds having been described in no literature and may be prepared, for example, by reacting 2-aminothiazole, N-methylpiperazine, pyrrole or indole with haloethylsulfonyl halide.

The present invention will be further described in detail with particular reference to the following examples, but it will be understood that these examples be preferred embodiments of the present invention and the invention be never limited thereto.

EXAMPLE 4 (Y=NH₂)

10 g. of the compound of the formula (III) wherein X is Cl is reacted in an autoclave in the presence of catalyst with either anhydrous ammonia or with ammonium carbonate and aqueous ammonia by heating the reactants. After completion of the reaction, the contents are made acidic by use of hydrochloric acid, the resulting precipitates removed by filtering off the same under suction, the filtrate evaporated under reduced pressure to dryness and the residue recrystallized from quantities of ethanol to obtain the hydrochloride of the desired product. Alternatively, the said filtrate is made alkaline by use of strong aqueous ammonia (to pH about 9) followed by evaporation under reduced pressure to dryness, the residue recrystallized from either water or from a mixture of water and acetone to obtain the desired product. The melting points and details of the reaction conditions are shown in Table 2, while the element analysis in Table 3.

perature of 100° C. for about 6 hours. The contents are thereafter made acidic by use of hydrochloric acid, the precipitates formed thereby filtered off under suction. The filtrate is evaporated under reduced pressure to dryness, the residue recrystallized from methanol or ethanol to obtain the hydrochloride of the desired product (i.e. nicotinoylaminoethanesulfonylaminothiazole hydrochloride).

Alternatively, the filtrate as described above is made alkaline by use of ammonia and evaporated under reduced pressure to dryness, the residue being recrystallized from water to obtain the desired product as colorless needles. Yield about 20%. Its molecular weight and element analysis are shown in Table 3. As in Example 4, there resulted some reduction in yield when there was employed, as the starting material, the bromide (Z=Br) or iodide (Z=I) or no catalysts were employed.

The desired product wherein R is thiazolyl-2-amino and Y is nicotinoylamino has a melting point of 229° C. and the hydrochloride thereof of 288° C.

TABLE 3

| Compound | | Molecular formulas | Percent Calculated | | | Percent Found | | |
|---|---|---|---|---|---|---|---|---|
| | | | C | H | N | C | H | N |
| Ia | N-methylpiperazine family | C₇H₁₇N₃O₂S | 40.58 | 8.21 | 20.29 | 40.65 | 8.18 | 20.20 |
| Ia (hydrochloride) | N-methylpiperazine family | C₇H₂₀N₃O₂SCl₂ | 26.50 | 6.31 | 13.25 | 26.72 | 6.28 | 13.33 |
| Ib | Pyrrole family | C₆H₁₀N₂O₂S | 41.38 | 5.74 | 16.09 | 41.25 | 5.82 | 16.21 |
| Ib (hydrochloride) | do | C₆H₁₂N₂O₂SCl₂ | 29.15 | 4.87 | 11.34 | 29.28 | 4.76 | 11.42 |
| Ic | Thiazole family | C₁₁H₁₂N₄O₃S₂ | 42.31 | 3.85 | 17.95 | 42.38 | 3.91 | 17.72 |
| Ic (hydrochloride) | do | C₁₁H₁₄N₄O₃S₂Cl₂ | 34.29 | 3.64 | 14.55 | 34.31 | 3.60 | 14.47 |
| Id | do | C₅H₉N₃O₂S₂ | 28.99 | 4.35 | 20.29 | 29.12 | 4.21 | 20.34 |
| Id (hydrochloride) | do | C₅H₁₁N₃O₂S₂Cl₂ | 21.43 | 3.93 | 15.00 | 21.38 | 3.99 | 15.23 |
| Ie | Indolyl family | C₁₀H₁₂N₂O₂S | 53.57 | 5.36 | 12.50 | 53.63 | 5.28 | 12.63 |
| Ie (hydrochloride) | do | C₁₀H₁₃N₂O₂SCl | 46.07 | 4.99 | 10.75 | 46.11 | 4.89 | 10.68 |

TABLE 1

| R | M.P. of the desired product, degrees | M.P. of the hydrochloride of the desired product, degrees |
|---|---|---|
| CH₃—N⟨⟩N— (Ia) | ¹ 345–352 | ¹ 318–319 |
| ⟨N⟩— (Ib) | ¹ 352–356 | ¹ 319–322 |
| N⟨S⟩—NH— (Id) | 325–332 | ² 216 |
| ⟨indole⟩ (Ie) | ³ 323–328 | ³ 258–264 |

¹ Colored and decomposed—colorless crystals.
² Colorless crystals.
³ Colored and decomposed.

TABLE 2

| Starting amine (g.) | Reaction time (hrs.) | Temperature (° C.) | Yield (percent) Ia | Ib | Id | Ie | Catalyst and the added amount thereof (g.) |
|---|---|---|---|---|---|---|---|
| Anhydrous ammonia (20) | 5 | 100 | 50 | 43 | 36 | 40 | NaI(0.45) |
| Do | 5 | 100 | 52 | 45 | 40 | 48 | Cu₂Cl₂(1.0) |
| Na₂CO₃ (10)¹ | 8 | 140 | 38 | 34 | 30 | 38 | Cu₂Cl₂(0.4) |

¹ 28% NH₄OH (20 ml.).

NOTE: When the above-described reaction was repeated except that there was employed, as the starting material, the bromide (X=Br) or iodide (X=I) in place of the chloride (X=Cl), there resulted some reduction in yields. Similar reduction in yields occurred also when using no catalysts.

EXAMPLE 5 (Y=Nicotinoylamino) (c)

To 5 g. of the compound of the formula (II) wherein R is thiazolyl and Z is Cl is added 8 g. of nicotinic acid amide or its hydrochloride, and the mixture is reacted, in an autoclave, in the presence of 3 g. of Cu₂Cl₂ at a tem- The above is an explanation as to the manufacture of the desired compounds by amination (and nicotinoylamination) of the corresponding halides.

As hereunder is an explanation of deacylation of the corresponding acylamino (or acylimino) compounds. More particularly, said method is concerned with a process for preparing the desired products by deacylating, by way of hydrolysis or hydrazinolysis, a compound represented by the general formula $$R—SO_2CH_2CH_2Q \qquad (II)$$

wherein R represents the same meanings as described above and Q is an acylamino or acylimino group. Preferred examples of the acylamino group include aliphatic acylamino groups such as acetylamino and propionylamino groups, as well as aromatic amino groups such as benzoylamino and nicotinoylamino groups. Preferred example of the acylamino group is phthalimino group. Of course, these specific examples of the acylamino and acylimino groups are mentioned only by way of example to explain the present invention. Therefore it will be understood that the present invention be by no means restricted to employment of such specific examples.

The above-described hydrolysis may be effected advantageously in any known manner where there are employed, for example, acids, sodium alcoholate, alkali metal hydroxides, alkali metal carbonates or the like materials. In particular, preferred results may be obtained in the present invention when a concentrated solution of alkali metal hydroxide such as NaOH or KOH.

When the deacylation of the invention is to be effected by hydrazinolysis, there may be employed any known method for it, such as one wherein hydrazine hydrate is added into a methanolic or ethanolic solution with subsequent treatment with hydrochloric acid.

Starting materials in this method are also novel compounds having never been described in any literature and may be prepared, for example, by the reaction of N-methylpiperazine, pyrrole, indole or 2-aminothiazole with an acylaminoethanesulfonyl halide.

The present method will be further illustrated in detail with particular reference to the following examples, but it will be understood that these examples be preferred embodiments of the present method and the present invention be never limited thereto.

EXAMPLE 6

Into the starting material wherein Q is phthalimino group is added a 30 w./v. percent solution of hydroxide followed by boiling the mixture under reflux for 3–5 hours. After cooling the mixture is made acidic by use of concentrated hydrochloric acid while ice-cooling, and then adjusted to a pH of about 9 by addition of sodium carbonate. The crystals precipitated thereby are separately stored. The filtrate is evaporated under reduced pressure to dryness, the residue being recrystallized from either water or from a mixture of water and acetone and the resulting crystals, together with the previously stored crystals, being recrystallized several times from either water or from a mixture of water and acetone to obtain the desired product as colorless crystals. The details of these reactions are shown in Table 4.

Similar procedures are repeated except that there are employed, as the starting material, ones wherein Q is benzoylamino or acetylamino group, the corresponding desired products are obtained in yields as tabulated in Table 5. The element analysis of the desired products thus obtained are shown in Table 6.

All of the resulting products are in the form of colorless crystals.

TABLE 5

| R | Q | Amount used (g.) | Yield (g.) |
|---|---|---|---|
| $CH_3-N\diagdown N-$ | Phthalimino | 10 | 4.5 |
| | Acetamino | 10 | 4.7 |
| (pyrrolidinyl)N— | Phthalimino | 10 | 4.0 |
| | Acetamino | 10 | 4.3 |
| (indolyl) | Phthalimino | 10 | 5.5 |
| | Acetamino | 10 | 6.2 |
| (thiadiazolyl)-NH— | Phthalimino | 10 | 3.2 |
| | Acetamino | 10 | 3.5 |

TABLE 6

| R | Molecular formula | Calculated | | | Found | | |
|---|---|---|---|---|---|---|---|
| | | C | H | N | C | H | N |
| $H_3C-N\diagdown N-$ | $C_7H_{17}N_3O_2S$ | 40.58 | 8.21 | 20.29 | 40.67 | 8.18 | 20.33 |
| (pyrrolidinyl)N— | $C_6H_{10}N_2O_2S$ | 41.38 | 5.74 | 16.09 | 41.25 | 5.83 | 16.22 |
| (indolyl) | $C_{10}H_{12}N_2O_2S$ | 53.27 | 5.36 | 12.50 | 53.68 | 5.38 | 12.60 |
| (thiadiazolyl)-NH— | $C_5H_9N_3O_2S_2$ | 28.99 | 4.35 | 20.29 | 29.05 | 4.30 | 20.38 |

TABLE 4

| R (10 g.) | Amount of sodium hydroxide solution added (ml.) | M.P. of the desired product, degrees | Yield, g. |
|---|---|---|---|
| $H_3C-N\diagdown N-$ | 50 | [1] 345,352 | 3.2 |
| (pyrrolidinyl)N— | 50 | [1] 352–356 | 3.0 |
| (indolyl) | 40 | [1] 323–330 | 3.5 |
| (thiadiazolyl)-NH— | 40 | [1] 325–332 | 2.3 |

[1] Colored and composed.

EXAMPLE 6

To the starting material wherein Q is phthalimino group is added from about 5 to 8 times its volume of 95% ethanol followed by the addition of 1.1 times its molar amount of hydrazine hydrate (of about 100%). The mixture is heated under reflux for about 2 hours with continuous stirring. Thereafter, the mixture is adjusted to a pH of about 1 by the addition of hydrochloric acid, heated on water bath for further about 30 minutes and filtered in hot to remove the precipitated phthalic acid hydrazide, the filtrate being cooled to precipitate the hydrochloride of the desired product which is then filtered and then recrystallized several times to purify the same. [Alternatively, the said filtrate is evaporated under reduced pressure to dryness and the residue is made alkaline (pH about 9) by the addition of a $Na_2CO_3$ solution followed by evaporating again under reduced pressure to dryness. The residue is recrystallized several times from water or from a mixture of water and acetone to obtain the free desired product.] The details of the reactions are shown in Table 7. In addition, the element analysis of the hydrochloride of the desired product is shown in Table 8.

By the way, when, in Example 6, sodium carbonate is employed to make the reaction mixture alkaline, the hydrochloride as obtained in this example may be also obtained by reducing the amount thereof added and thereby making the mixture weakly acidic.

TABLE 7

| R | Amount of the starting material used (g.) | Amount of hydrazine hydrate (g.) | M.P. of the HCl salt of the desired product, degree | Yield (g.) | Solvent used for recrystallizing the HCl salt |
|---|---|---|---|---|---|
| CH₃—N⟨ ⟩N— | 130 | 22 | ¹ 318–319 | 52 | Ethanol. |
| ⟨pyrrole⟩N— | 122 | 22 | ¹ 319–322 | 45 | Do. |
| ⟨indole⟩ | -------- | -------- | ¹ 258–264 | -------- | Do; |
| ⟨thiazole⟩—NH | -------- | -------- | ¹ 325–332 | -------- | Methanol. |

¹ Colored and decomposed.

TABLE 8

| R | Molecular formula | Calculated | | | Found | | |
|---|---|---|---|---|---|---|---|
| | | C | H | N | C | H | N |
| CH₃—N⟨ ⟩N— | C₇H₂₀N₃O₂SCl | 26.50 | 6.31 | 13.25 | 26.43 | 6.45 | 13.38 |
| ⟨pyrrole⟩N— | C₆H₁₂N₂O₂SCl | 29.51 | 4.87 | 11.34 | 29.27 | 4.78 | 11.45 |
| ⟨indole⟩ | C₁₀H₁₃N₂O₂SCl | 46.07 | 4.99 | 10.75 | 46.11 | 4.87 | 10.82 |

We claim:

1. A compound of the formula:

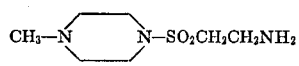

and the pharmaceutically acceptable acid addition salts thereof.

2. The compound according to claim 1 which has the formula:

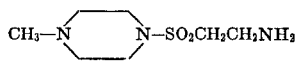

No references cited.

DONALD G. DAUS, Primary Examiner

J. TOVAR, Assistant Examiner

U.S. Cl. X.R.

260—294.8 D, 294.8 F, 306.8 R, 326.12 R; 424—250